Oct. 15, 1957   J. W. CORCORAN   2,809,514
APPARATUS FOR SHOCK TESTING
Filed April 21, 1954   2 Sheets-Sheet 1

INVENTOR.
John W. Corcoran
BY
Leonard H. King
AGENT

Oct. 15, 1957  J. W. CORCORAN  2,809,514
APPARATUS FOR SHOCK TESTING
Filed April 21, 1954  2 Sheets-Sheet 2

*INVENTOR.*
John W. Corcoran
BY
*Leonard H. King*
AGENT

United States Patent Office 2,809,514
Patented Oct. 15, 1957

2,809,514

APPARATUS FOR SHOCK TESTING

John W. Corcoran, Frederick, Md.

Application April 21, 1954, Serial No. 424,627

8 Claims. (Cl. 73—12)

This invention relates to testing apparatus and more particularly to systems for producing mechanical shocks.

The difficulties inherent in field testing materials and equipment have led to the development of laboratory testing apparatus which is capable of supplying mechanical shocks to simulate the shocks encountered by such materials and equipment when in use.

The increased use of more sensitive and complicated equipment under conditions of high acceleration requires an improvement in the apparatus for testing the ability of this equipment to cope with the mechanical shocks it will meet in service.

It is accordingly an object of the invention to provide improved shock testing equipment.

Another object of the invention is to provide apparatus for supplying damped shock pulses.

Another object of the invention is to provide shock testing equipment having a simple means for controlling the duration of the shock.

A further object of the invention is to provide shock testing equipment having a simple means for controlling the magnitude of the shock.

Still another object of the invention is to provide separate controls for controlling the duration and amplitude of the shock.

Briefly, a shock testing device in accordance with the invention comprises a pulse generator which supplies a surge of current to a transducer to produce the mechanical shock. After the shock is produced, the pulse generator operates in conjunction with the transducer as a damper to return the tested specimen to rest.

The invention will be best understood from the following description and accompanying drawings wherein.

Figure 1:
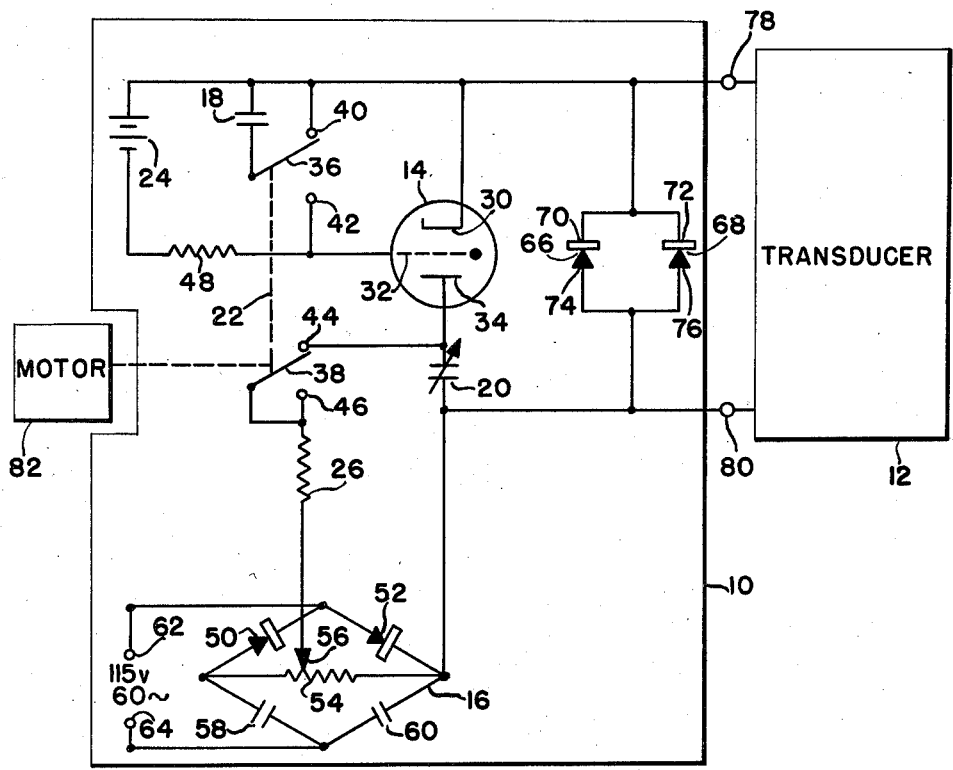
Fig. 1 illustrates a shock testing device in accordance with the invention.

Referring now to the shock testing device shown in Fig. 1, it is seen that the apparatus comprises the pulse generator 10 which transmits an electronic impulse to the transducer 12. The transducer 12 converts the electronic impulse into a mechanical shock pulse which is applied to a specimen in a manner as will be indicated.

The pulse generator 10 is designed to fulfill the general condition that there must always be a sequence of forces produced by shock testing apparatus for successful performance. By Newton's law, every body persists in a state of rest or of uniform motion in a straight line unless compelled by external force to change that state. In shock testing apparatus, it is essential that once a force is utilized to accelerate the specimen from rest, a subsequent force or series of forces must be provided to return the specimen to rest.

In mechanical systems, the specimen is brought to rest, after being accelerated, with the damped oscillations of the system. The damping of these mechanical systems is normally small so that the oscillations disadvantageously continue for an uncontrolled number of cycles so as to provide inconstant testing conditions.

In testing devices designed in accordance with the invention, however, the use of an electro-mechanical transducer (the transducer 12) permits the incorporation of a resistance in the electrical circuits; such resistance reflects as damping in the mechanical portion of the system. By accordingly designing the pulse generator 10 to supply a large initial electronic impulse of short duration to the transducer and to appear subsequently to the mechanical system as a relatively low damping resistance, a shock testing device is provided having a degree of control heretofore unrealized in prior shock testing devices.

The pulse generator 10 is shown as comprising the thyratron 14, the power supply 16, the capacitors 18 and 20, the switch 22, the D.-C. voltage source 24, the resistor 26, and the rectifier network 28.

The thyratron 14 includes the cathode 30 connected to one terminal of the capacitor 18 and the D.-C. voltage source 24, the grid 32, and the anode 34 coupled to one terminal of the variable capacitor 20.

The switch 22 includes the movable contacts 36 and 38. The movable contact 36 can be isolated from the cathode 30 and the positive terminal of the D.-C. voltage source 24 by the capacitor 18. The movable contact 38 is coupled via the resistor 26 to the power supply 16. The switch 22 also includes the contacts 40, 42, 44 and 46. The contact 40 is connected to the positive terminal of the D.-C. voltage source 24 and to the cathode 30, the contact 42 is coupled via a resistor 48 to the negative terminal of the D.-C. voltage source 24 and to the grid 32, the contact 44 is coupled to the junction of the anode 34 and the variable capacitor 20; and the contact 46 is an open circuit contact.

The switch 22 is a double-pole, double-throw switch whose functions include permitting the capacitors 18 and 20 to be charged.

The power supply 16 is a bridge type power supply which receives a one-hundred fifteen volts, sixty cycle A.-C. voltage via terminals 62 and 64. The power supply 16 includes the rectifiers 50 and 52 in series and shunted by the resistor 54. The junction of the rectifiers 50 and 52 is coupled to the terminal 62. Also in parallel with the rectifiers 50 and 52 are the capacitors 58 and 60 in series. The junction of the capacitors 58 and 60 is connected to the terminal 64. The power supply 16 is a low power source which can be replaced by other suitable power supplies.

The rectifier network 28 includes the rectifiers 66 and 68 whose cathodes 70 and 72, respectively, are connected to the cathode 30 of the thyratron 14. The anodes 74 and 76 of the rectifiers 66 and 68, respectively, are connected to the junction of the variable capacitor 20 and the power supply 16. Across the rectifier network 28 is coupled the transducer 12 via the terminals 78 and 80.

In operation, the switch 22 is normally positioned so that the movable contacts 36 and 38 meet the contacts 40 and 44, respectively. As a result, the variable capacitor 20 is charged through the resistor 26 from the tap 56 of the power supply 16. The tap 56 is an independent control by which the maximum charge of the capacitor 20 is determined and thereby the force of the shock. When the capacitor 20 is charged to the extent of the applied potential, the apparatus is ready to supply a shock.

It should be noted that, due to the positioning of the switch 22, the capacitor 18 has its terminals shorted so that the grid 32 of the thyratron 14 is negatively biased in respect to the cathode 30 by the D.-C. voltage source 24.

The shock is triggered by displacing the movable contacts 36 and 38 to meet the contacts 42 and 46. When the movable contact 36 meets the contact 42, the cathode 30 is, for a brief time, effectively shorted to the grid 32 by virtue of the fact that the D.-C. voltage source 24 is charging the capacitor 18. The thyratron 14 is thus enabled to discharge while the grid 32 returns to its normal negative bias as the capacitor 18 reaches its full charge.

Simultaneously, the variable capacitor 20, not being able to discharge through the open contact 46, discharges through the ignited thyratron 14 and applies a surge of current to the transducer 12.

It will be noted that, due to the polarity of the rectifiers 66 and 68, the rectifier network 28 presents a high impedance to the discharge of the variable capacitor 20. Thereby, the variable capacitor 20 discharges in a time which is controlled by the selected capacity of the variable capacitor 26 and the parameters of the transducer 12.

The capacitor 20 is purposely made a variable capacitor in order to provide an independent control of the time of discharge thus permitting the time duration of the shock pulse to be controlled. It has been previously noted that the tap 56 enables the magnitude of the charge on the movable capacitor 20 to be controlled so as to permit controlling the magnitude of the shock pulse.

When the variable capacitor 20 discharges to a point below the extinction voltage of the thyratron 14, the thyratron 14 extinguishes and, due to the reassumed negative bias of the grid 32, awaits further operation of the switch 22 before again igniting.

The pulse generator 10 thus supplies a pulse of current to the transducer 12 which converts the pulse of current into a shock pulse which is applied to a specimen. In review, it will be noted that the magnitude and duration of the pulse of current is controllable by means of the tap 56 and the variable capacitor 20 which provide simple and independent means of controlling the shock pulse dimensions.

When repetitive shock pulses are required, a motor such as the motor 82 can be provided in mechanical linkage with the switch 22. The motor 82 can be any of the electrical or mechanical motors well-known to those skilled in the art and can be linked to the switch 22 by any of the commonly known methods. The function of the motor 82 is to control the placement of the movable contacts 36 and 38. In this function, the motor 82 and the mechanical linkage can, of course, be replaced by suitable electronic circuits as, for example, gating circuits controlled by multi-vibrators or flip-flop circuits.

Figure 2:
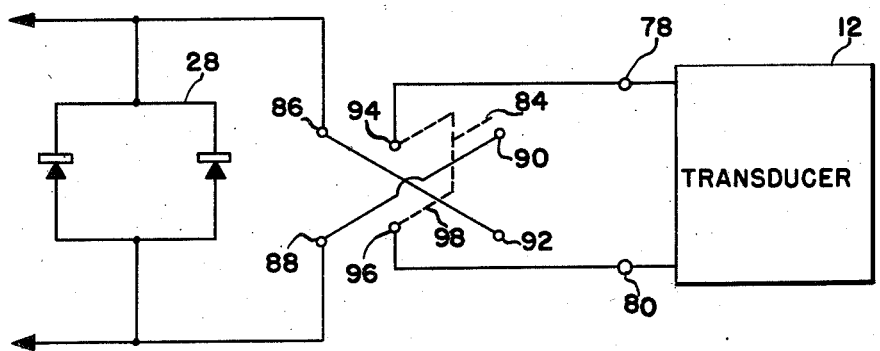
Fig. 2 illustrates a modification of the shock testing device of Fig. 1.

As will be shown, the current pulse determines the dimensions of the resulting shock pulse. Referring now to Fig. 2, the reversing switch 84 is shown included in the circuit and controls the polarity with which the current pulse is applied to the transducer 12.

The reversing switch 84 is a double-pole, double-throw knife blade switch. The rectifier network 28 is connected to the terminals 86 and 88 of the reversing switch 84 which are connected in crosswise fashion to the terminals 90 and 92.

The terminals 94 and 96 are coupled to the terminals 78 and 80 so that, depending upon how the knife blades 98 are switched, the current pulse is applied to the transducer 12 in one polarity or another. It will be noted that the rectifier network 28 is positioned to be unaffected by the reversing switch 84 and thus always presents a high impedance to the pulse passed by the thyratron 14.

Figure 3:
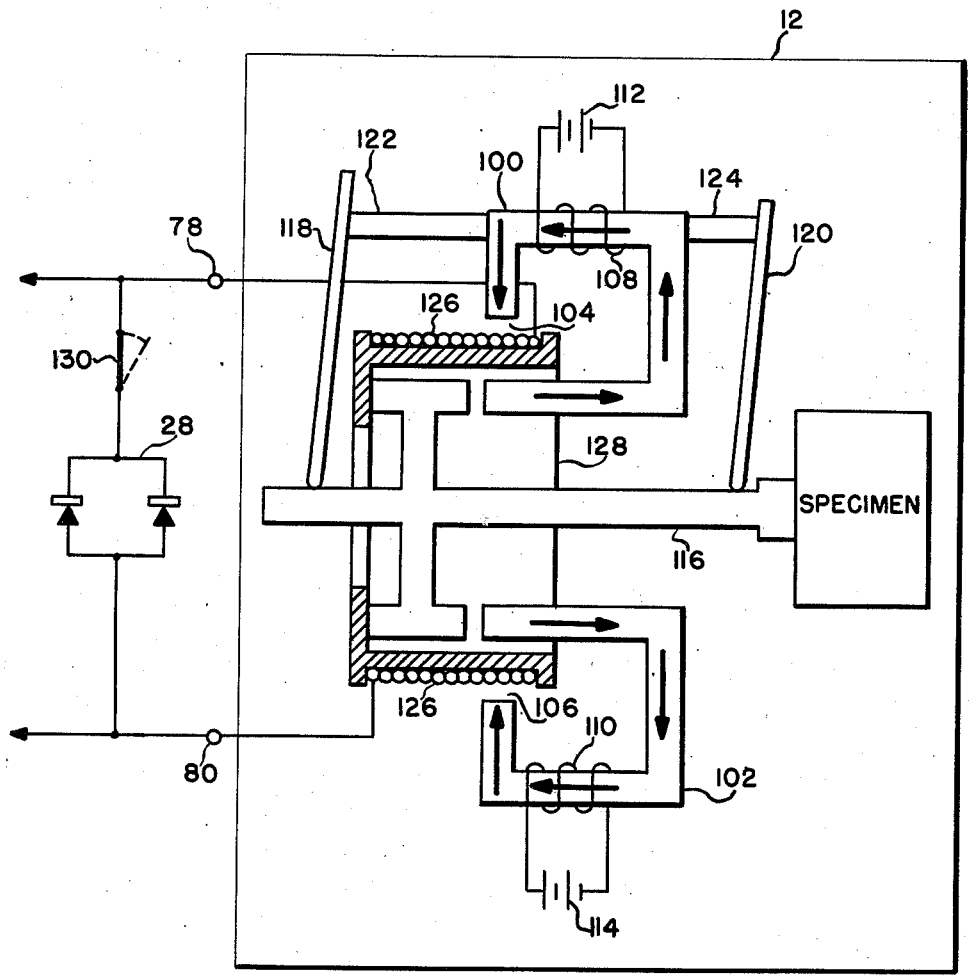
Fig. 3 illustrates the details of the transducer of Fig. 1.

Referring now to Fig. 3, the details of the transducer 12 are shown with the rectifier network 28. The transducer 12 converts current pulses to shock pulses.

The transducer 12 comprises the magnetic cores 100 and 102 having the air gaps 104 and 106, respectively. The coil 108 is wound upon the magnetic core 100; and the coil 110 is wound upon the magnetic core 102. The coils 108 and 110 are energized by the D.-C. sources 112 and 114, respectively.

Interposed between the cores 100 and 102 is the driver 116 which is made of any suitable rigid material suitable for imparting a shock to the specimen. The driver 116 is supported intermediately between the cores 100 and 102 by the flexure springs 118 and 120, the ends of which are mounted in a fixed position in respect to the cores 100 and 102 by the mounts 122 and 124.

A coil 126 (shown cross-sectionally) is connected across the terminals 78 and 80 and is wound upon a frame 128 which is made from a suitable rigid and non-conductive material. The frame 128 should be strong enough to withstand the shock generated by the apparatus. The frame 128 is rigidly affixed to the driver 116 so that the coil 126 is supported within the air gaps 104 and 106 of the magnetic cores 100 and 102.

In operation, the D.-C. sources 112 and 114 energize the coils 108 and 110 creating a magnetic field illustrated by arrows in the magnetic cores 100 and 102. It will be noted that the coil 126 lies in the path of this magnetic field.

Thus, when a pulse of current is applied to the coil 126 via the terminals 78 and 80, the magnetic field created in the coil 126 reacts with the magnetic field of the cores 100 and 102. A translational force is produced which is perpendicular to a plane formed by the direction of the magnetic field of the magnetic cores 100 and 102 and the direction of the current flowing through this field in the coil 128. As a result, the coil 126 is thrust through the air gaps 104 and 106 carrying the frame 128 and the driver 116 with it. In this manner, a sudden acceleration or shock is imparted to the specimen which can be attached to the driver 116 by clamps or other suitable conventional methods.

It will now be recalled that the general condition must be fulfilled that there must always be a sequence of forces produced by shock testing apparatus for successful performance and that forces must be provided to return the specimen to rest.

After the shock has been delivered to the specimen, the current begins to decay and the potential due to the inductance of the moving coil 126 assumes, in accordance with Lenz's law, a polarity which causes it to aid the current from capacitor 20. When the potential at the terminals 78 and 80 of transducer 12 reverses itself, thyratron 14 ceases to conduct. However, the rectifier network 28 is conductive and provides a path for this current until it decays to zero. This is a relatively minor effect.

Considering now the moving coil 126 moving through the magnetic fields of the magnetic cores 100 and 102, it will be realized that the E. M. F. induced in the moving coil 126 by virtue of its movement through this magnetic field tends to oppose the potential by which motion is produced. The E. M. F. induced is equivalent to, i. e. caused by the mechanical load. The kinetic energy of the motion of the mechanical system translates itself into potential energy in compressing the flexure springs 118 and 120. In this manner, the driver is decelerated until the now deformed flexure springs 118 and 120 cause a reversal in direction of movement of the combination of moving coil 126, frame 128 and driver 116. As the moving coil 126 is returned towards its initial position, once again a current is induced which tends to resist the motion of the moving coil 126. When this damping current is generated, the rectifier network 28 starts to conduct and the mechanical system is damped as it returns to rest.

It should be realized that unilateral conductors such as the rectifiers 66 and 68 of the rectifier network 28 are employed so that a high impedance is presented to the initial shock-producing pulse for high efficiency. A pure resistance or other impedance can, however, be substituted for the rectifier network 28. In this case, it will be noted that some of the shock-producing current will be shunted around the moving coil 126 by the substituted resistor or other impedance.

It has been found that critical damping is obtained when:

$$2\sqrt{\frac{L_1}{C_2}} < R_1 + R_3 < \frac{1}{2}\sqrt{\frac{L_2}{C_2}}$$

where $L_1$ is the inductance of moving coil 126;
$L_2$ is the equivalent electrical inductance of transducer 12;
$R_1$ is the resistance of coil 126;
$R_3$ is the forward resistance of rectifier: and
$C_2$ is the equivalent electrical capacitance of transducer 12.

Also considered in accordance with the principle of the invention is an auxiliary coil attached to the moving coil frame 128 in conjunction with a controlled load which may be utilized to control the damping of the shock testing apparatus.

A further modification is indicated in Fig. 3 by the use of the switch 130. The switch 130 when opened prevents induced current in the moving coil 126 from finding a closed circuit whereby if undamped oscillations are required following the initial shock pulse the switch 130 can be previously opened. This control provides a simple means for improving the flexibility of the disclosed apparatus so that the apparatus is capable of providing both damped and undamped shock pulses.

Thus, in accordance with the invention, shock testing apparatus is provided having great flexibility. The apparatus can supply damped shock pulses and is provided with separate controls for controlling the magnitude and duration of the shock.

There will now be obvious to those skilled in the art many modifications and variations utilizing the principles set forth and realizing many or all of the objects and features of the apparatus described but which do not depart essentially from the spirit of the invention.

What is claimed is:

1. Apparatus for shock testing a specimen comprising a switch, a storage device for storing electrical energy connected to said switch, said storage device being responsive to said switch for releasing the stored energy, means for connecting said storage device to a source of electrical energy and an electro-mechanical means connected to said storage device responsive to the released energy for rapidly accelerating said specimen which is affixed to said electro-mechanical means in a normal position, said electro-mechanical means including means to decelerate the specimen after it has been accelerated and means to return the specimen to its normal position, said electro-mechanical means operating electro-mechanically to damp the movement of the specimen.

2. Apparatus for shock testing a specimen comprising a switch, a storage device for storing electrical energy connected to said switch, said storage device being responsive to said switch for releasing the stored energy, means for connecting said storage device to a source of electrical energy and an electro-mechanical means connected to said storage device responsive to the released electrical energy for rapidly accelerating the specimen, said electro-mechanical means comprising a magnetic core having an air gap, a moving coil supported within said air gap, means for causing a magnetic field in said air gap, means for supporting said specimen in operative relationship with said moving coil, said moving coil being responsive to the released electrical energy for accelerating said supporting means, and electro-mechanical means for damping the movement of said supporting means.

3. Apparatus for shock testing a specimen comprising a switch, a storage device for storing electrical energy connected to said switch, said storage device being responsive to said switch for releasing the stored energy, means for connecting said storage device to a source of electrical energy and an electro-mechanical means connected to said storage device responsive to the released electrical energy for rapidly accelerating the specimen, said electro-mechanical means comprising magnetic cores having air gaps, a moving coil supported within said gaps, means for causing a magnetic field in said air gaps, means for supporting said specimen in operative relationship with said moving coil, said moving coil being responsive to the released electrical energy for accelerating said supporting means, electro-mechanical means for damping the movement of said supporting means, and means for preventing the damping.

4. Apparatus for shock testing a specimen comprising a triggering device, a switch for operating said triggering device, a storage device for storing electrical energy connected to said triggering device, said storage device being responsive to said triggering device for releasing the stored electrical energy, means for connecting said storage device to a source of electrical energy an electro-mechanical transducer connected to said triggering device for converting the released electrical energy into mechanical energy, and an impedance coupled to said electro-mechanical transducer, said electro-mechanical transducer comprising magnetic cores having air gaps, a moving coil supported within said air gaps, means for causing a magnetic field in said air gaps, supporting means for supporting said specimen affixed to said moving coil, said moving coil being responsive to the released electrical energy for being accelerated in said air gaps, and flexure spring means for decelerating said moving coil and returning said moving coil to its original position, a damping current being induced in said moving coil while it is returnng to its original position, said impedance completing a circuit for the damping current whereby the motion of said moving coil is damped.

5. Apparatus for shock testing a specimen comprising a triggering device, a switch for operating said triggering device, a storage device for storing electrical energy connected to said triggering device, said storage device being responsive to said triggering device for releasing the stored electrical energy, means for connecting said storage device to a source of electrical energy an electro-mechanical transducer connected to said triggering device for converting the released electrical energy into mechanical energy, and an impedance coupled to said electro-mechanical transducer, said electro-mechanical transducer comprising magnetic cores having air gaps, a moving coil supported within said air gaps, means for causing a magnetic field in said air gaps, supporting means for supporting said specimen affixed to said moving coil, said moving coil being responsive to the released electrical energy for being accelerated in said air gaps, and flexure spring for decelerating said moving coil and returning said moving coil to its original position, a damping current being induced in said moving coil while it is returning to its original position, said impedance completing a circuit for the damping current whereby the motion of said moving coil is damped.

6. Apparatus for shock testing a specimen comprising a gas discharge tube, a bias supply for preventing said gas discharge tube from being discharged, a variable capacitor connected to said gas discharge tube, a low power source, a switch connecting a variable portion of said low power source to said variable capacitor for charging said variable capacitor, said switch being operable to render said bias supply ineffective, said gas discharge tube discharging when said bias supply is ineffective, said variable capacitor discharging a pulse of predetermined polarity through said discharged gas discharge tube, a rectifier network presenting a high impedance to the pulse of predetermined polarity, and a transducer responsive to the pulse of predetermined polarity for producing a mechanical shock, said transducer comprising magnetic cores having air gaps, a moving coil supported in said air gaps, said moving coils being responsive to the pulse of predetermined polarity for being accelerated through said air gaps and producing current to resist the acceleration, and flexure springs to resist the acceleration and return the moving coil to its original position, said moving coil generating a current to resist the motion of the coil in returning to its original position, said rectifier network presenting a low impedance to the current which resists the motion.

7. Apparatus for shock testing a specimen comprising a triggering device, a switch for operating said triggering device, a storage device for storing electrical energy connected to said triggering device, said storage device being responsive to said triggering device for releasing the stored electrical energy in the form of a pulse of predetermined polarity, means for connecting said storage device to a source of electrical energy an electro-mechanical transducer connected to said triggering device for converting the released electrical energy into mechanical energy, and an impedance coupled to said electro-mechanical transducer, said electro-mechanical transducer comprising magnetic cores having air gaps, a moving coil supported within said air gaps, means for causing a magnetic field in said air gaps, supporting means for supporting said specimen affixed to said moving coil, said moving coil being responsive to the released electrical energy for being accelerated in said air gaps, flexure spring means for decelerating said moving coil and returning said moving coil to its original position, a damping current being induced in said moving coil while it is returning to its original position, said impedance completing a circuit for the damping current whereby the motion of said moving coil is damped, and means to reverse the polarity of the pulse of predetermined polarity.

8. Apparatus for shock testing a specimen comprising a triggering device, a switch for operating said triggering device, a storage device for storing electrical energy connected to said triggering device, said storage device being responsive to said triggering device for releasing the stored electrical energy, means for connecting said storage device to a source of electrical energy an electro-mechanical transducer connected to said triggering device for converting the released electrical energy into mechanical energy, and an impedance coupled to said electro-mechanical transducer, said electro-mechanical transducer comprising magnetic cores having air gaps, a moving coil supported within said air gaps, means for causing a magnetic field in said air gaps, supporting means for supporting said specimen and being affixed to said moving coil, said moving coil being responsive to the released electrical energy for being accelerated in said air gaps, flexure spring means for decelerating said moving coil and returning said moving coil to its original position, a damping current being induced in said moving coil while it is returning to its original position, a rectifier network, said impedance completing a circuit including said rectifier network for the damping current whereby the motion of said moving coil is damped, and means to render the rectifier network ineffective.

References Cited in the file of this patent

UNITED STATES PATENTS

| | | |
|---|---|---|
| 2,259,565 | Hutcheson | Oct. 21, 1941 |
| 2,561,027 | Liesch | July 17, 1951 |
| 2,599,036 | Efromson et al. | June 3, 1952 |
| 2,648,979 | Cornett | Aug. 18, 1953 |
| 2,651,012 | Van Valkenburg et al. | Sept. 1, 1953 |
| 2,677,960 | Moses | May 11, 1954 |